United States Patent
Sakata

(10) Patent No.: US 11,714,410 B2
(45) Date of Patent: *Aug. 1, 2023

(54) VEHICLE DRIVING SYSTEM

(71) Applicant: TOYOTA JIDOSHA KABUSHIKI KAISHA, Toyota (JP)

(72) Inventor: Hirokazu Sakata, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/712,554

(22) Filed: Apr. 4, 2022

(65) Prior Publication Data
US 2022/0221858 A1 Jul. 14, 2022

Related U.S. Application Data

(63) Continuation of application No. 16/255,491, filed on Jan. 23, 2019, now Pat. No. 11,327,484.

(30) Foreign Application Priority Data

Mar. 9, 2018 (JP) ................................ 2018-042876

(51) Int. Cl.
*G05D 1/00* (2006.01)
*G01K 13/00* (2021.01)
(Continued)

(52) U.S. Cl.
CPC ........... *G05D 1/0061* (2013.01); *G01K 3/005* (2013.01); *G01K 13/00* (2013.01); *G05D 1/0088* (2013.01); *G07C 5/08* (2013.01)

(58) Field of Classification Search
CPC .... G05D 1/0061; G05D 1/0088; G01K 3/005; G01K 13/00; G07C 5/08
See application file for complete search history.

(56) References Cited

U.S. PATENT DOCUMENTS 6,655,326 B2 * 12/2003 Purcell ............... G05D 23/1917
123/41.1
2011/0160965 A1 6/2011 Oh
(Continued)

FOREIGN PATENT DOCUMENTS

CN 104820424 A 8/2015
CN 107656519 A 2/2018
(Continued)

OTHER PUBLICATIONS

Machine translation of JP2007220559 (Year: 2007).*
(Continued)

*Primary Examiner* — Mahmoud S Ismail
*Assistant Examiner* — Gabriel Anfinrud
(74) *Attorney, Agent, or Firm* — Oliff PLC

(57) ABSTRACT

A vehicle driving system that controls switching between automatic driving by a vehicle and manual driving by a driver of the vehicle includes a temperature sensor configured to monitor a temperature of an automatic driving ECU which controls the automatic driving; and a microcontroller configured to: (i) set a threshold temperature based on an estimated gradient of increase in the temperature of the automatic driving ECU, the estimated gradient of increase being estimated based on a drive state of an equipment installed on the vehicle, and (ii) in a case where the temperature of the automatic driving ECU that is sensed by the temperature sensor becomes equal to or greater than the threshold temperature, perform an operation for prompting the driver to switch to the manual driving during the automatic driving.

14 Claims, 3 Drawing Sheets

(51) Int. Cl.
    *G01K 3/00*     (2006.01)
    *G07C 5/08*     (2006.01)

(56) References Cited

U.S. PATENT DOCUMENTS

| | | | |
|---|---|---|---|
| 2014/0156134 A1 | 6/2014 | Cullinane et al. | |
| 2014/0326442 A1 | 11/2014 | Kurpiewski et al. | |
| 2015/0070160 A1 | 3/2015 | Davidsson et al. | |
| 2015/0218913 A1 | 8/2015 | Cooley et al. | |
| 2016/0075210 A1 | 3/2016 | Quaranta-Guido | |
| 2017/0001674 A1 | 1/2017 | Ishii et al. | |
| 2017/0197635 A1 | 7/2017 | Sato | |
| 2018/0304828 A1* | 10/2018 | Kitani | B60W 50/023 |
| 2019/0126942 A1 | 5/2019 | Goto et al. | |
| 2019/0165396 A1 | 5/2019 | Farnsworth et al. | |
| 2019/0236865 A1 | 8/2019 | Mercep et al. | |

FOREIGN PATENT DOCUMENTS

| | | | |
|---|---|---|---|
| JP | H09-240502 A | | 9/1997 |
| JP | 2005-112033 A | | 4/2005 |
| JP | 2007220559 A | * | 8/2007 |
| JP | 2007220559 A | | 8/2007 |
| JP | 2008-254597 A | | 10/2008 |
| JP | 2010-187526 A | | 8/2010 |
| JP | 2012-203551 A | | 10/2012 |
| JP | 2016-050900 A | | 4/2016 |
| JP | 2016-078530 A | | 5/2016 |
| JP | 2017-074887 A | | 4/2017 |
| JP | 2017-199299 A | | 11/2017 |
| JP | 2017-200812 A | | 11/2017 |
| JP | 2017-216871 A | | 12/2017 |
| JP | 2017-218015 A | | 12/2017 |
| JP | 2017-218090 A | | 12/2017 |
| WO | 2015/083206 A1 | | 6/2015 |

OTHER PUBLICATIONS

2016 Tesla Model S Manual, p. 75 (Year: 2016).*
Oct. 2, 2020 Office Action Issued in U.S. Appl. No. 16/255,491.
Jan. 19, 2021 Office Action Issued in U.S. Appl. No. 16/255,491.
Jun. 28, 2021 Office Action issued in U.S. Appl. No. 16/255,491.
Nov. 8, 2021 Office Action Issued in U.S. Appl. No. 16/255,491.
Mar. 10, 2022 Notice of Allowance issued in U.S. Appl. No. 16/255,491.

* cited by examiner

VEHICLE DRIVING SYSTEM

This is a continuation of U.S. patent application Ser. No. 16/255,491 filed Jan. 23, 2019 (now U.S. Pat. No. 11,327,484), which claims priority from Japanese Patent Application No. 2018-042876 filed in Japan on Mar. 9, 2018. The disclosure of each of the prior applications is hereby incorporated by reference herein in its entirety.

BACKGROUND OF THE INVENTION

Field of the Invention

The present invention relates to a driving system to be mounted to a vehicle.

Description of the Background Art

Patent document 1 (Japanese Laid-Open Patent Publication No. 2016-078530), patent document 2 (Japanese Laid-Open Patent Publication No. 2017-199299), and patent document 3 (Japanese Laid-Open Patent Publication No. H09-240502) each disclose a vehicle driving system capable of performing control of switching between automatic driving by a vehicle and manual driving by a driver.

In the vehicle driving system, a system on a chip (SoC) having high processing performance is mounted to an ECU for control of the automatic driving (hereinafter, referred to as "automatic driving ECU") in order to execute automatic vehicle driving by calculating, while grasping the situation around the own vehicle, an appropriate travel route through acquisition of various information such as image information, object information, and map information from various sensors and memories.

The SoC has a large heat generation amount, and thus, in order to avoid hardware failure due to increase in the temperature thereof, a mechanism in which a hard IP (e.g., a circuit block having an image processing function) is shut down if a value from a temperature sensor provided in the SoC exceeds a predetermined value, is provided in advance.

If the hard IP is shut down when the temperature of the SoC is increased for a certain reason during automatic driving, a part of an automatic driving function being performed by the automatic driving ECU stops, and thus switching to manual driving needs to be swiftly performed. However, in a case where an operation for prompting the driver to perform the switching to the manual driving is started after a part of the automatic driving function being performed by the automatic driving ECU stops, the switching from the automatic driving by the vehicle to the manual driving by the driver may not be swiftly performed.

SUMMARY OF THE INVENTION

The present invention has been made in view of the aforementioned problem, and an object of the present invention is to provide a vehicle driving system capable of starting an operation for prompting a driver to perform switching to manual driving before a part of an automatic driving function being performed by an automatic driving ECU stops owing to increase in the temperature of the automatic driving ECU including a SoC.

In order to solve the aforementioned problem, one aspect of the present invention is a vehicle driving system capable of performing control of switching between automatic driving by a vehicle and manual driving by a driver, the vehicle driving system including: a temperature monitoring section configured to monitor a temperature of an automatic driving ECU which controls the automatic driving; and a control section configured to control, on the basis of the temperature of the automatic driving ECU, an operation for prompting the driver to perform the switching to the manual driving during the automatic driving.

With this configuration, while the automatic driving is being performed by the vehicle, the operation for prompting the driver to perform the switching to the manual driving can be performed as necessary on the basis of the change in the temperature of the automatic driving ECU.

In addition, in the one aspect, in a case where the temperature of the automatic driving ECU becomes equal to or greater than a predetermined first temperature threshold value that is less than a predetermined temperature upper limit within which execution of the automatic driving is allowed, the control section may execute a first operation for prompting the driver to perform the switching to the manual driving.

With this configuration, the operation for prompting the driver to perform the switching to the manual driving can be swiftly started before, for a certain reason, the temperature of the automatic driving ECU reaches the predetermined temperature upper limit within which execution of the automatic driving is allowed (e.g., before a part of the automatic driving function stops as a result of the automatic driving ECU being shut down).

In addition, in the one aspect, the control section may set the first temperature threshold value on the basis of: the temperature upper limit; a sufficient predetermined time period from a time when the first operation is executed to a time when the driver performs the switching to the manual driving; and a gradient of increase in the temperature of the automatic driving ECU.

By providing the predetermined time period as described above, handover of the driving operation from the vehicle to the driver can be safely performed.

In addition, in the one aspect, in a case where the switching to the manual driving fails to be performed even after execution of the first operation, and the temperature of the automatic driving ECU becomes equal to or greater than a predetermined second temperature threshold value that is greater than the first temperature threshold value but less than the temperature upper limit, the control section may execute a second operation for prompting the driver to perform the switching to the manual driving.

By providing the temperature threshold values in a stepwise manner as described above, the handover of the driving operation from the vehicle to the driver can be performed with a fail-safe measure.

In addition, in the one aspect, the control section may change the gradient of increase in the temperature of the automatic driving ECU on the basis of a drive state of at least one of a rear air conditioner and a blower used for cooling the automatic driving ECU.

Accordingly, transfer of a driving authority can be performed by estimating the change in the temperature of the automatic driving ECU in accordance with the cooling capability of a cooling mechanism.

In addition, another aspect of the present invention is a driving authority transfer method to be executed by a computer of a vehicle driving system capable of performing control of switching between automatic driving by a vehicle and manual driving by a driver, the driving authority transfer method including: a step of monitoring a temperature of an automatic driving ECU which controls the automatic driving; and a step of controlling, on the basis of the temperature of the automatic driving ECU, an operation for prompting the driver to perform the switching to the manual driving during the automatic driving.

With this method, while the automatic driving is being performed by the vehicle, the operation for prompting the driver to perform the switching to the manual driving can be performed as necessary on the basis of the change in the temperature of the automatic driving ECU.

With the aforementioned vehicle driving system according to the present invention, the operation for prompting the driver to perform the switching to the manual driving can be started before a part of the automatic driving function being performed by the automatic driving ECU stops owing to increase in the temperature of the automatic driving ECU including a SoC.

These and other objects, features, aspects, and advantageous effects of the present invention will become more apparent from the following detailed description of the present invention when taken in conjunction with the accompanying drawings.

DESCRIPTION OF THE PREFERRED EMBODIMENTS

[Outline]

A vehicle driving system according to the present invention capable of performing control of switching between automatic driving by a vehicle and manual driving by a driver controls, on the basis of the temperature of an automatic driving ECU, an operation for prompting the driver to perform the switching to the manual driving during the automatic driving. Accordingly, the operation for prompting the switching from the automatic driving by the vehicle to the manual driving by the driver can be swiftly started before a part of an automatic driving function stops as a result of the automatic driving ECU being shut down owing to increase in the temperature thereof

[Configuration]

Figure 1:
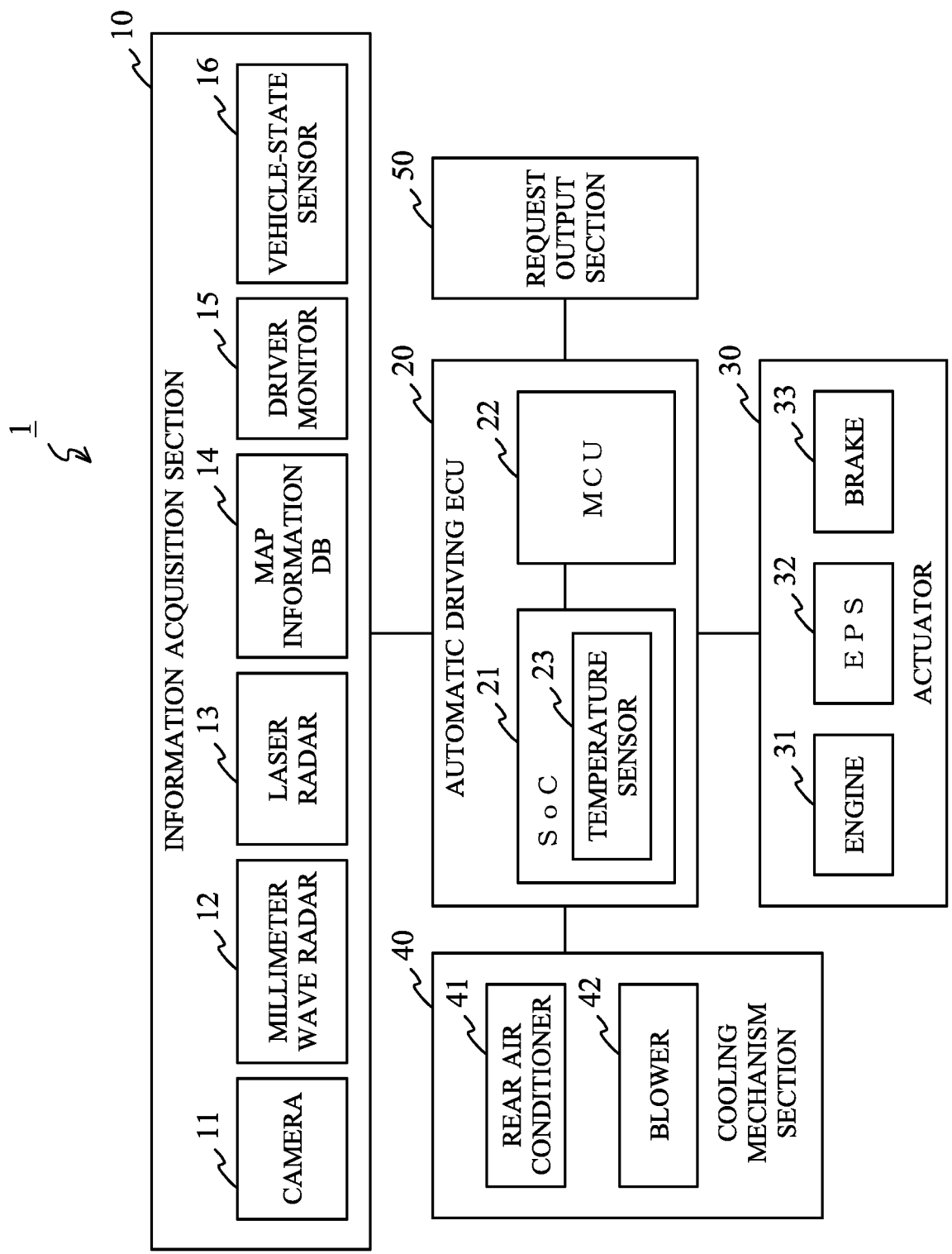
FIG. 1 is a diagram indicating a schematic configuration of a vehicle driving system according to an embodiment of the present invention.

FIG. 1 is a diagram indicating a schematic configuration of a vehicle driving system 1 according to an embodiment of the present invention. The vehicle driving system 1 indicated in FIG. 1 includes an information acquisition section 10, an automatic driving ECU 20, an actuator 30, a cooling mechanism section 40, and a request output section 50.

The information acquisition section 10 is a device for acquiring various information about the situation around the vehicle and the state of a vehicle body, and is composed of, for example, a camera 11, a millimeter wave radar 12, a laser radar 13, a map information database (DB) 14, a driver monitor 15, and a vehicle-state sensor 16. The various information acquired by the information acquisition section 10 are outputted to the automatic driving ECU 20.

The automatic driving ECU 20 is an electronic control unit for controlling automatic driving that is performed by the vehicle, and includes at least one SoC 21 and at least one MCU (Micro Controller Unit) 22. The SoC 21 executes a predetermined calculation and a predetermined process that are related to automatic driving, on the basis of the various information acquired by the information acquisition section 10. In the SoC 21, a temperature sensor 23 (corresponding to "temperature monitoring section" in the claims) which monitors the temperature of the SoC 21 in order to protect a hard IP (not shown) is included. On the basis of the results of the calculation and the process executed by the SoC 21, the MCU 22 (corresponding to "control section" in the claims) outputs a control signal for appropriately operating the actuator 30, thereby controlling the automatic driving of the vehicle. In addition, on the basis of the temperature being monitored by the temperature sensor 23 and the drive state of the cooling mechanism section 40, the MCU 22 controls the operation for prompting the driver to perform the switching to the manual driving during the automatic driving, via the request output section 50.

The actuator 30 is a device for executing travel control of the vehicle, and is composed of, for example, an engine actuator (engine) 31, a steering actuator (EPS) 32, and a brake actuator (brake) 33. The actuator 30 is operated on the basis of the control signal from the automatic driving ECU 20.

The cooling mechanism section 40 is a device for cooling the automatic driving ECU 20, and is composed of, for example, a rear air conditioner 41 and/or a blower 42. The drive state of the cooling mechanism section 40 is outputted to the automatic driving ECU 20. A front air conditioner may be used instead of the rear air conditioner 41.

The request output section 50 is a device that outputs, for the driver, a request for a predetermined operation for transferring a driving authority from the vehicle to the driver during the automatic driving, i.e., an operation for prompting the switching from the automatic driving by the vehicle to the manual driving by the driver, on the basis of an instruction from the automatic driving ECU 20.

[Control]

Figure 2:
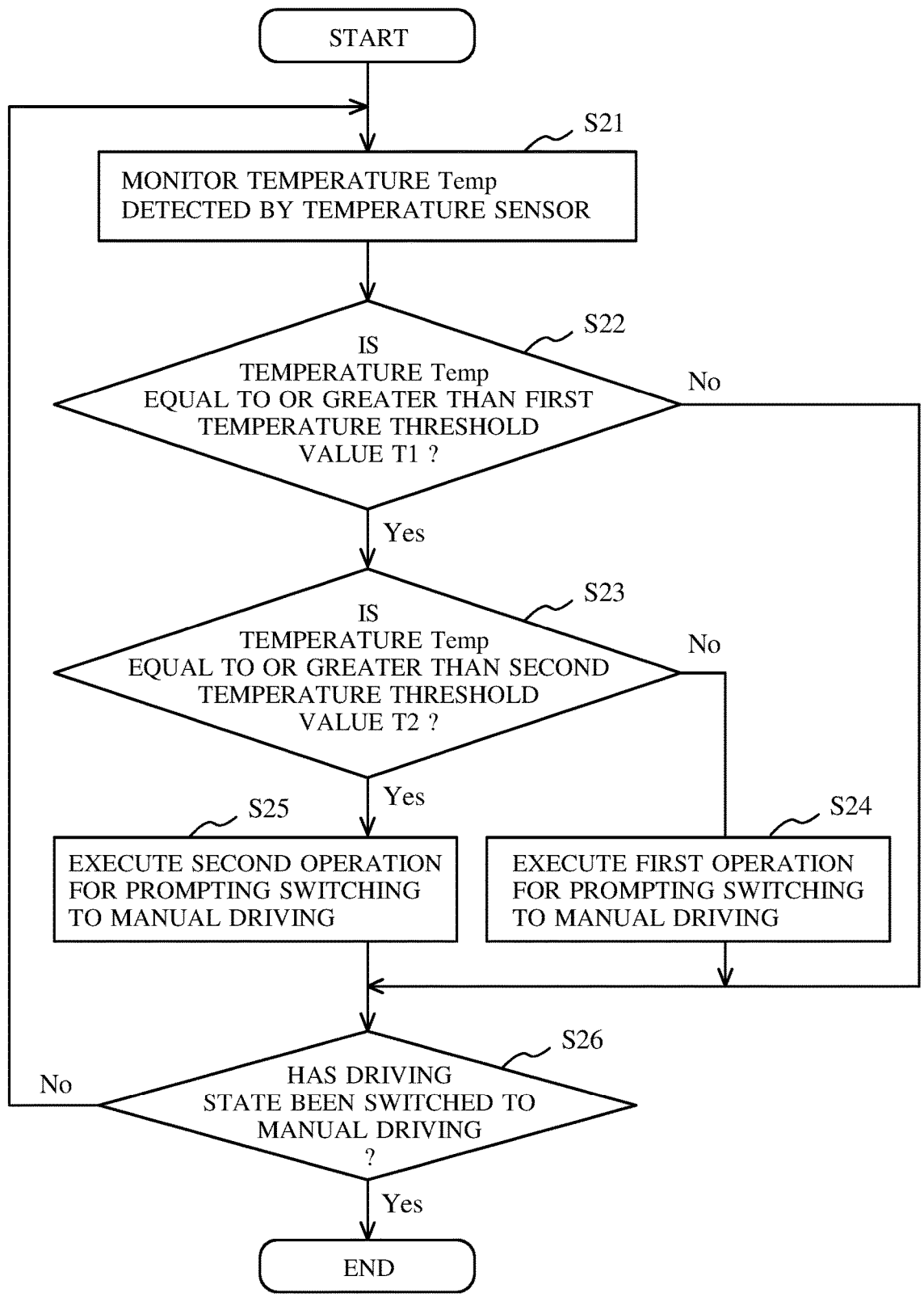
FIG. 2 is a flowchart indicating a processing procedure of driving authority transfer control executed by an automatic driving ECU of the vehicle driving system.
Figure 3A:
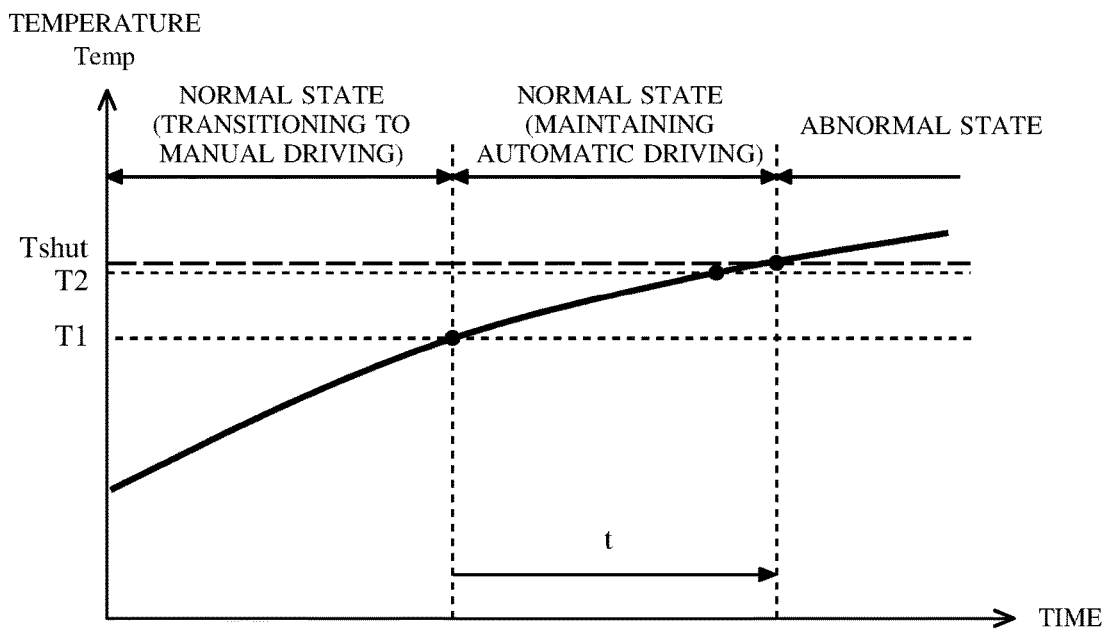
FIG. 3A and FIG. 3B are diagrams for explaining increase, with the elapse of time, in the temperature detected by a temperature sensor.
Figure 3B:
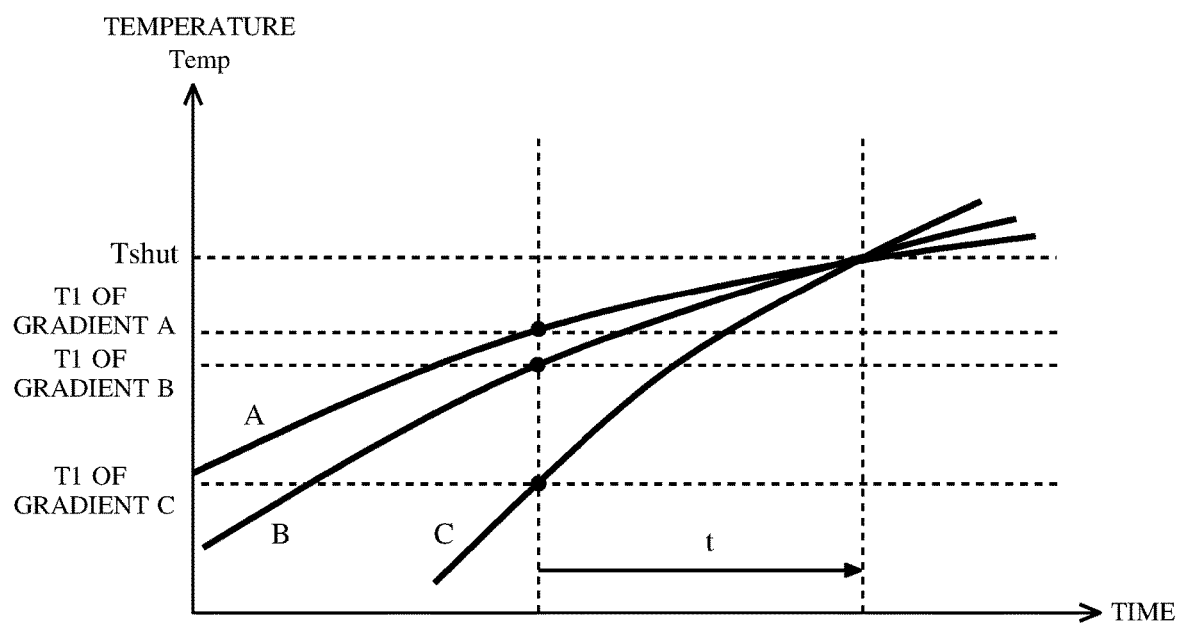

Next, the control executed by the vehicle driving system 1 according to the embodiment of the present invention will be described with further reference to FIG. 2, FIG. 3A, and FIG. 3B. FIG. 2 is a flowchart indicating a processing procedure of driving authority transfer control executed by the automatic driving ECU 20 of the vehicle driving system 1. FIG. 3A and FIG. 3B are diagrams for explaining increase, with the elapse of time, in the temperature detected by the temperature sensor 23.

The driving authority transfer control indicated in FIG. 2 is started when the driving state of the vehicle is switched from the manual driving by the driver to the automatic driving by the vehicle.

Step S21: The automatic driving ECU 20 starts monitoring a temperature Temp detected by the temperature sensor 23 included in the SoC 21.

Step S22: The automatic driving ECU 20 determines whether or not the temperature Temp detected by the temperature sensor 23 becomes equal to or greater than a predetermined first temperature threshold value T1. The first temperature threshold value T1 is a reference temperature according to which determination is made as to whether or not to perform the operation for prompting the switching from the automatic driving by the vehicle to the manual driving by the driver, while a normal state is still kept. More specifically, as shown in FIG. 3A, the first temperature threshold value T1 is set to such a temperature that, when a predetermined time period t elapses from a time point corresponding to the first temperature threshold value T1, the temperature of the SoC 21 reaches a temperature Tshut at which the hard IP is shut down. The temperature Tshut at which the hard IP is shut down, corresponds to a temperature upper limit, for the automatic driving ECU 20, within which execution of the automatic driving is allowed. The predetermined time period t is set to a sufficient time period from a time when the operation for prompting the switching to the manual driving by the driver is performed to a time when the driver performs the switching to the manual driving, and the time period t may be set to, for example, "4 seconds" as defined in an item regarding safe handover in category B2 of the ACSF regulation. The first temperature threshold value T1 can be determined on the basis of the gradient of increase in the temperature of the SoC 21, the gradient being changed in accordance with the drive state of the cooling mechanism section 40.

For example, as shown in FIG. 3B, since the SoC 21 is not cooled if neither the rear air conditioner 41 nor the blower 42 is driven at all, the temperature Temp increases at a high gradient indicated by a curve C. On the other hand, if, for example, the blower 42 is driven, the SoC 21 is cooled by blown air, and thus the temperature Temp increases at a gradient indicated by a curve B gentler than the curve C. In addition, if the rear air conditioner 41 is driven, the SoC 21 is cooled by cool air, and thus the temperature Temp increases at a gradient indicated by a curve A further gentler than the curve B. Thus, the automatic driving ECU 20 can set the first temperature threshold value T1, according to which determination is made in step S22, on the basis of the temperature Tshut and the predetermined time period t in a state where an appropriate gradient of increase in the temperature is determined on the basis of the drive state of the cooling mechanism section 40. These gradients of increase in the temperature are each desirably set to a worst value in consideration of a variation (low temperature/normal temperature/high temperature, circuit, etc.) in each of the rear air conditioner 41 and the blower 42.

In a case where the temperature Temp is less than the first temperature threshold value T1 (step S22; No), the process proceeds to step S26. In a case where the temperature Temp is equal to or greater than the first temperature threshold value T1 (step S22; Yes), the process proceeds to step S23.

Step S23: The automatic driving ECU 20 determines whether or not the temperature Temp detected by the temperature sensor 23 becomes equal to or greater than a predetermined second temperature threshold value T2. Similarly to the aforementioned first temperature threshold value T1, the second temperature threshold value T2 is a reference according to which determination is made as to whether or not to perform the operation for prompting the switching from the automatic driving by the vehicle to the manual driving by the driver, while a normal state is still kept. The second temperature threshold value T2 is provided as a fail-safe measure for supplementing the first temperature threshold value T1, and is preferably set to, as shown in FIG. 3A, a temperature (T1<T2<Tshut) immediately below the temperature Tshut at which the hard IP of the SoC 21 is shut down.

In a case where the temperature Temp is less than the second temperature threshold value T2 (step S23; No), the process proceeds to step S24. In a case where the temperature Temp is equal to or greater than the second temperature threshold value T2 (step S23; Yes), the process proceeds to step S25.

Step S24: Since there is a risk that the hard IP of the SoC 21 is shut down after the elapse of the predetermined time period t, the automatic driving ECU 20 executes a first operation for prompting the switching from the automatic driving by the vehicle to the manual driving by the driver. The first operation may be, specifically, an operation for requesting handover of the driving operation to the driver. When the first operation is executed, the process proceeds to step S26.

Step S25: Since there is a risk that the hard IP of the SoC 21 is shut down before long, the automatic driving ECU 20 executes a second operation for prompting the switching from the automatic driving by the vehicle to the manual driving by the driver. The second operation may be, specifically, an operation for more urgently requesting the handover of the driving operation to the driver since the switching to the manual driving has failed to be performed even after execution of the first operation. The second operation may be identical to the aforementioned first operation, or may be different therefrom. When the second operation is executed, the process proceeds to step S26.

Step S26: The automatic driving ECU 20 determines whether or not the driving state of the vehicle has been switched from the automatic driving by the vehicle to the manual driving by the driver. In a case where the driving state of the vehicle remains to be the automatic driving (step S26; No), the process returns to step S21, and the series of control steps based on the temperature Temp are executed. On the other hand, in a case where the driving state of the vehicle is switched to the manual driving (step S26; Yes), the driving authority transfer control is ended.

Operation and Effect in Present Embodiment

As described above, the vehicle driving system 1 according to the embodiment of the present invention includes: the temperature sensor 23 which monitors the temperature Temp of the automatic driving ECU 20 (SoC 21); and the MCU 22 which performs, via the request output section 50, a request for prompting the driver to perform the switching to the manual driving during the automatic driving, on the basis of the temperature Temp.

With this configuration, while the automatic driving is being performed by the vehicle, if the temperature of the automatic driving ECU 20 is changing such that there is a risk that the hard IP of the SoC 21 is shut down, the operation for prompting the switching from the automatic driving by the vehicle to the manual driving by the driver can be swiftly started before a part of the automatic driving function being performed by the automatic driving ECU 20 stops.

In particular, in the automatic driving ECU 20 in the present embodiment, the operations (first and second operations) for prompting the driver to perform the switching to the manual driving are performed in a stepwise manner, i.e., performed in the case where the temperature Temp of the SoC 21 becomes equal to or greater than the first temperature threshold value T1 and in the case where the temperature Temp becomes equal to or greater than the second temperature threshold value T2 immediately before the shutdown, and the first temperature threshold value T1 is set on the basis of the temperature upper limit, the predetermined time period t, and the gradient of increase in the temperature of the SoC 21, whereby the handover of the driving operation from the vehicle to the driver can be safely performed with the fail-safe measure.

In addition, the automatic driving ECU 20 in the present embodiment changes the gradient of increase in the temperature of the SoC 21 on the basis of the drive state of at least one of the rear air conditioner 41 and the blower 42 used for cooling the automatic driving ECU 20, and thus can perform the transfer of the driving authority by estimating the change in the temperature of the automatic driving ECU 20 in accordance with the cooling capability of the cooling mechanism section 40.

In the aforementioned embodiment, the example where the temperature Temp of the SoC 21 is monitored by the temperature sensor 23 included in the SoC 21, has been described. However, instead of using the temperature sensor 23, the temperature Temp of the SoC 21 may be estimated from a temperature measured by an ambient temperature sensor and an actual calculation time based on internal load of the SoC 21.

Furthermore, in the aforementioned embodiment, the example where the temperature sensor 23 included in the SoC 21 performs monitoring as to whether or not the temperature Temp of the SoC 21 becomes equal to or greater than the second temperature threshold value T2, has been described. However, the following operations may be performed: the operation situation of the hard IP is grasped, and it is determined that the hard IP has come to be in a predetermined state, so that it is assumed that the hard IP is in a state immediately before the shutdown.

While the present invention has been described in detail, the foregoing description is in all aspects illustrative and not restrictive. It will be understood that numerous other modifications and variations can be devised without departing from the gist of the present invention.

What is claimed is:

1. A vehicle driving system that controls switching between automatic driving by a vehicle and manual driving by a driver of the vehicle, the vehicle driving system comprising:
    a temperature sensor configured to monitor a temperature of an automatic driving ECU which controls the automatic driving; and
    a microcontroller configured to: (i) set a threshold temperature based on an estimated gradient of increase in the temperature of the automatic driving ECU, the estimated gradient of increase being estimated based on a drive state of an equipment installed on the vehicle, and (ii) in a case where the temperature of the automatic driving ECU that is sensed by the temperature sensor becomes equal to or greater than the threshold temperature, perform an operation for prompting the driver to switch to the manual driving during the automatic driving.

2. The vehicle driving system according to claim 1, wherein
    the threshold temperature is a first temperature threshold value, and in a case where the temperature of the automatic driving ECU that is sensed by the temperature sensor becomes equal to or greater than the first temperature threshold value that is less than a temperature upper limit within which operation of the automatic driving is allowed, the microcontroller executes a first operation for prompting the driver to switch to the manual driving.

3. The vehicle driving system according to claim 2, wherein
    the microcontroller sets the first temperature threshold value based on: the temperature upper limit; a predetermined time period; and the estimated gradient of increase in the temperature of the automatic driving ECU.

4. The vehicle driving system according to claim 2, wherein
    in a case where the driver fails to switch to the manual driving even after execution of the first operation, and the temperature of the automatic driving ECU that is sensed by the temperature sensor becomes equal to or greater than a second temperature threshold value that is greater than the first temperature threshold value but less than the temperature upper limit, the microcontroller executes a second operation for prompting the driver to switch to the manual driving.

5. The vehicle driving system according to claim 1, wherein
    the equipment installed on the vehicle is cooling equipment that cools the automatic driving ECU.

6. The vehicle driving system according to claim 5, wherein
    the microcontroller changes the estimated gradient of increase in the temperature of the automatic driving ECU based on a drive state of at least one of a rear air conditioner and a blower used for cooling the automatic driving ECU.

7. The vehicle driving system according to claim 1, wherein
    the microcontroller sets the threshold temperature, relative to a temperature upper limit, so that the operation for prompting the driver to switch to the manual driving is performed before the automatic driving ECU is shut down due to the temperature of the automatic driving ECU reaching the temperature upper limit, the threshold temperature being less than the temperature upper limit.

8. A driving authority transfer method executed by a computer of a vehicle driving system that controls switching between automatic driving by a vehicle and manual driving by a driver of the vehicle, the driving authority transfer method comprising:
    monitoring a temperature of an automatic driving ECU which controls the automatic driving;
    setting a threshold temperature based on an estimated gradient of increase in the temperature of the automatic driving ECU, the estimated gradient of increase being estimated based on a drive state of an equipment installed on the vehicle; and
    in a case where the temperature of the automatic driving ECU that is monitored becomes equal to or greater than the threshold temperature, performing an operation for prompting the driver to switch to the manual driving during the automatic driving.

9. The method according to claim 8, wherein
    the threshold temperature is a first temperature threshold value, and in a case where the temperature of the automatic driving ECU that is monitored becomes equal to or greater than the first temperature threshold value that is less than a temperature upper limit within which operation of the automatic driving is allowed, executing a first operation for prompting the driver to switch to the manual driving.

10. The method according to claim 9, wherein
    the first temperature threshold value is set based on: the temperature upper limit; a predetermined time period; and the estimated gradient of increase in the temperature of the automatic driving ECU.

11. The method according to claim 9, wherein
    in a case where the driver fails to switch to the manual driving even after execution of the first operation, and the temperature of the automatic driving ECU that is monitored becomes equal to or greater than a second temperature threshold value that is greater than the first temperature threshold value but less than the temperature upper limit, executing a second operation for prompting the driver to switch to the manual driving.

12. The method according to claim 8, wherein the equipment installed on the vehicle is cooling equipment that cools the automatic driving ECU.

13. The method according to claim 12, wherein the estimated gradient of increase in the temperature of the automatic driving ECU is changed based on a drive state of at least one of a rear air conditioner and a blower used for cooling the automatic driving ECU.

14. The method according to claim 8, wherein the threshold temperature is set, relative to a temperature upper limit, so that the operation for prompting the driver to switch to the manual driving is performed before the automatic driving ECU is shut down due to the temperature of the automatic driving ECU reaching the temperature upper limit, the threshold temperature being less than the temperature upper limit.

* * * * *